(12) United States Patent
Murotani et al.

(10) Patent No.: US 7,567,969 B2
(45) Date of Patent: Jul. 28, 2009

(54) FILE MANAGEMENT APPARATUS AND METHOD, AND STORAGE SYSTEM

(75) Inventors: Akira Murotani, Odawara (JP); Tetsuya Abe, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 319 days.

(21) Appl. No.: 11/399,376

(22) Filed: Apr. 7, 2006

(65) Prior Publication Data

US 2007/0156703 A1    Jul. 5, 2007

(30) Foreign Application Priority Data

Dec. 15, 2005    (JP)    ............................. 2005-367977

(51) Int. Cl.
*G06F 7/00* (2006.01)
*G06F 17/30* (2006.01)
*G06F 12/00* (2006.01)

(52) U.S. Cl. ............................. 707/10; 707/6; 707/200
(58) Field of Classification Search .................. 707/10, 707/6, 200
See application file for complete search history.

(56) References Cited

U.S. PATENT DOCUMENTS 6,850,955 B2    2/2005    Sonoda et al.

2006/0004751 A1 *    1/2006    Ujino et al. ..................... 707/6
2007/0143349 A1 *    6/2007    Iwasaki ......................... 707/200

FOREIGN PATENT DOCUMENTS

JP    2003-162439    6/2003

* cited by examiner

*Primary Examiner*—Mohammad Ali
*Assistant Examiner*—Alexey Shmatov
(74) *Attorney, Agent, or Firm*—Mattingly & Malur, PC

(57) ABSTRACT

The present invention provides a file management system and method, and a storage system that can prevent file-multiplexing in a storage apparatus, and efficiently use the storage capacity of the storage apparatus.

The storage apparatus stores first management information for managing two or more kinds of classification list, each classification list including one or more keywords, and second management information for managing the kinds of classification list set for each of one or more users with regard to each of one or more tiers of their respective virtual file trees; and sends, in response to a request from a client apparatus to search the classification lists for a classification list set for a directory, the classification list set for the relevant user with regard to the tier matching the request to the client apparatus with reference to the first and second management information.

11 Claims, 14 Drawing Sheets

FIG.3

| # | CLASSIFICATION LIST NAME | CLASSIFICATION KEYWORD |
|---|---|---|
| 001 | PERIOD | 2004, 2005, 2006 |
| 002 | PRODUCT SERIES | P100, P200 |
| 003 | PRODUCT ATTRIBUTES | PERFORMANCE, PRICE, SPECIFICATIONS |
| 004 | BUSINESS AFFAIRS | PRESENTATION, DEVELOPMENT, PRODUCTION |
| ... | ... | ... |

41 = #; 42 = CLASSIFICATION LIST NAME; 43 = CLASSIFICATION KEYWORD; 40

FIG.4

| USER | CLASSIFICATION LIST NUMBER | | |
|---|---|---|---|
| | 1st | 2nd | 3rd |
| Tanaka | #003 | #002 | · |
| Satou | #002 | #004 | #003 |
| ... | ... | ... | ... |

51 = USER; 52 = CLASSIFICATION LIST NUMBER; 53 = 1st; 54 = 2nd; 55 = 3rd; 50

FIG.5

| I-NODE NUMBER (61) | I-NODE INFORMATION NUMBER FILE NAME, OWNER, FILE SIZE, FILE ADDRESS, ETC. (62) | FILE KEYWORDS (63) |
|---|---|---|
| ... | ... | ... |
| 16 | ..., P100 PERFORMANCE ANNOUNCEMENT.xls ..., FILE ADDRESS ttt | FILE SERIES #12345 P100, PERFORMANCE, PRESENTATION |
| ... | ... | ... |

| fd (71) | I-NODE/KEYWORD LIST (72) |
|---|---|
| 10002 | PERFORMANCE |
| 10003 | PERFORMANCE, P100 |
| 50016 | 16 |
| ... | ... |

70

| I-NODE NUMBER | I-NODE INFORMATION |
|---|---|
| 2 | OWNER, FILE SIZE, FILE ADDRESS aaa OF "/" |
| 10 | OWNER, FILE SIZE, FILE ADDRESS bbb OF "/USR" |
| 100 | OWNER, FILE SIZE, FILE ADDRESS ccc OF "/USR/DIR1" |
| 101 | OWNER, FILE SIZE, FILE ADDRESS ddd OF "/USR/DIR1/FILE1.txt" |
| ... | ... |

92

| ADDRESS | CONTENT |
|---|---|
| aaa | usr, 10, bin, 20, etc, 30 |
| bbb | dir1, 100, dir2, 200, ... |
| ccc | file1.txt, 101 |
| ddd | FILE DATA |
| ... | ... |

| ADDRESS | CONTENT |
|---|---|
| ... | ... |
| fff | FILE DATA OF P100 PERFORMANCE ANNOUNCEMENT.xls |
| ... | ... |

| fd (71) | I-NODE OR KEYWORD LIST (72) |
|---|---|
| 10002 | PERFORMANCE |
| 10003 | PERFORMANCE, P100 |
| 50016 | 16 |
| 50017 | 17 |
| ... | ... |

70

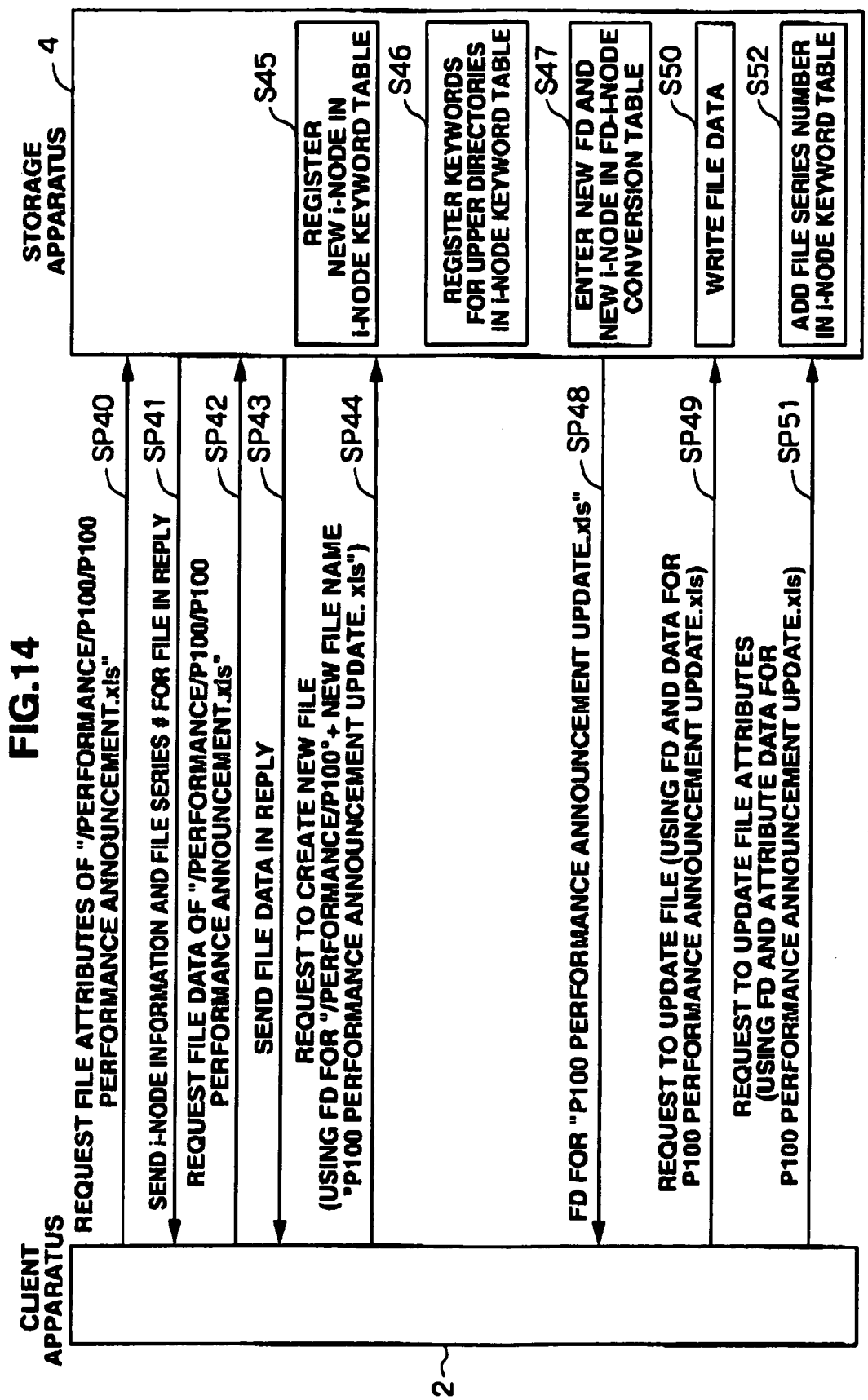

FIG.16

| i-NODE NUMBER | i-NODE INFORMATION NUMBER FILE NAME, OWNER, FILE SIZE, FILE ADDRESS, ETC. | FILE KEYWORDS |
|---|---|---|
| ... | ... | ... |
| 16 | P100 PERFORMANCE ANNOUNCEMENT. xls, ... | FILE SERIES NUMBER #12345, P100, PERFORMANCE, PRESENTATION |
| 17 | P100 PERFORMANCE ANNOUNCEMENT UPDATE. xls, ... | FILE SERIES NUMBER #12345, P100, PERFORMANCE |
| ... | ... | ... |

61 / 62 / 63 / 60

FIG.17
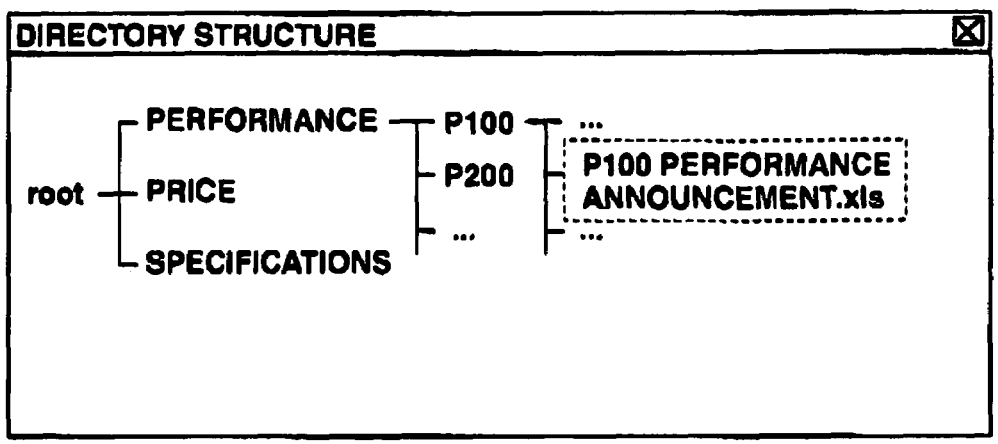
FIG.18
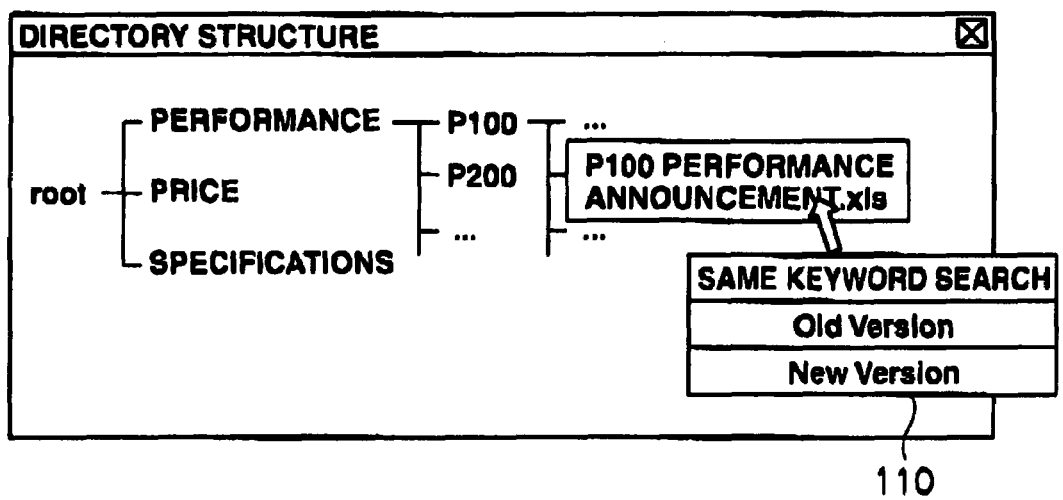
FIG.19

FILE MANAGEMENT APPARATUS AND METHOD, AND STORAGE SYSTEM

CROSS-REFERENCES TO RELATED APPLICATIONS

This application relates to and claims priority from Japanese Patent Application No. 2005-361977, filed on Dec. 15, 2005, the entire disclosure of which is incorporated herein by reference.

BACKGROUND

1. Field of the Invention

The present invention relates to a file management apparatus and method, and a storage system; for example, one that is ideal for adoption in a storage system including a storage apparatus having the NAS (Network Attached Storage) function.

2. Description of Related Art

Recently, the need for file-sharing services using NAS has been increasing year by year. Also, in network systems that provide these file-sharing services, the frequency of access to NAS tends to increase with an increase in the capacity of the files shared.

Under these circumstances, JP-A-2003-162439 discloses a storage system having a plurality of NAS interfaces, each NAS interface having at least one of a block interface that processes disk block-based I/O requests and a file interface that processes file-based I/O requests, wherein a file system that can be accessed from a plurality of file servers is created on a disk, and wherein a log storing area that retains an update log for the file system, and a management file server information storing area that retains information related to a management file server that performs the exclusion control of the file system and manages the log storing area are created in shared memory.

According to this method, it is possible for a plurality of NAS interfaces to access an identical file system, thereby providing a highly-reliable storage system in which data will not be lost even when a failure occurs.

SUMMARY

In conventional storage systems provided with the aforementioned NAS interfaces, the capacity required for the storage systems tends to be double as a result of users copying and storing frequently-used files in other directories and the files thereby being stored two or three times.

Methods like associating particular files or utilizing a software link called a "shortcuts" can be considered as means to prevent the above problem. However, these methods increase troubles for users, and thus, they cannot be considered effective.

The present invention has been made in view of the above points, and an object of the present invention is to provide a file management system and method, and a storage system that can prevent file-multiplexing in a storage apparatus, and efficiently use the storage capacity of the storage apparatus. In order to achieve this object, the present invention includes a file management apparatus for managing one or more files stored in a storage apparatus, the file management apparatus including: a memory unit that stores first management information for managing two or more kinds of classification list, each classification list including one or more keywords, and second management information for managing the kinds of classification list set for each of one or more users with regard to each of one or more tiers of their respective virtual file trees; and a control unit that sends, in response to a request from a client apparatus to search the classification lists for a classification list set for a directory, the classification list set for the relevant user with regard to the tier matching the request to the client apparatus with reference to the first and second management information.

Consequently, this file management apparatus makes it possible to set a flexible directory structure for a storage apparatus according to a user's requirements without changing the access method from a client apparatus.

The present invention is also a file management method for managing one or more files stored in a storage apparatus, the method including: a first step of storing first management information for managing two or more kinds of classification list, each classification list including one or more keywords, and second management information for managing the kinds of classification list set for each of one or more users with regard to each of one or more tiers of their respective virtual file trees; and a second step of sending, in response to a request from a client apparatus to search the classification lists for a classification list for a directory, the classification list set for the relevant user with regard to the tier matching the request to the client apparatus with reference to the first and second information.

This file management method makes it possible to set a flexible directory structure for a storage apparatus according to a user's requirements without changing the access method from a client apparatus.

Furthermore, the present invention is a storage system having a storage apparatus that stores file data, and a client apparatus that writes/reads the file data to/from the storage apparatus, the storage apparatus including: a memory unit that stores first management information for managing two or more kinds of classification list, each classification list including one or more keywords, and second management information for managing the kinds of classification list set for each of one or more users with regard to each of one or more tiers of their respective virtual file trees; and a control unit that, in response to a request from the client apparatus to search the classification lists for a classification list for a directory, sends the classification list set for the relevant user with regard to the tier matching the request to the client apparatus with reference to the first and second management information; wherein the client apparatus displays each of the one or more keywords included in the classification list received from the storage apparatus as a virtual directory.

This storage system makes it possible to set a flexible directory structure for a storage apparatus according to a user's requirements without changing the access method from a client apparatus.

The present invention makes it possible to achieve a file management apparatus and method, and a storage system which can efficiently utilize the storage capacity of a storage apparatus.

BRIEF DESCRIPTION OF THE DRAWINGS

FIG. 3 is a conceptual diagram illustrating a classification list table.

FIG. 4 is a conceptual diagram illustrating a user virtual directory table.

FIG. 5 is a conceptual diagram illustrating an i-node—keyword table.

FIG. 6 is a conceptual diagram illustrating an fd—i-node conversion table.

FIG. 14 is a flowchart provided to explain a file copy function in a storage system.

FIG. 16 is a flowchart provided to explain a file copy function in a storage system.

FIG. 17 is a schematic diagram provided to explain a file search support function in a storage system.

FIG. 18 is a schematic diagram provided to explain a search mode menu window.

FIG. 19 is a schematic diagram provided to explain an additional search keyword window.

DETAILED DESCRIPTION OF THE PREFERRED EMBODIMENTS

An embodiment of the present invention will be described below with reference to each of the drawings.

Figure 1:
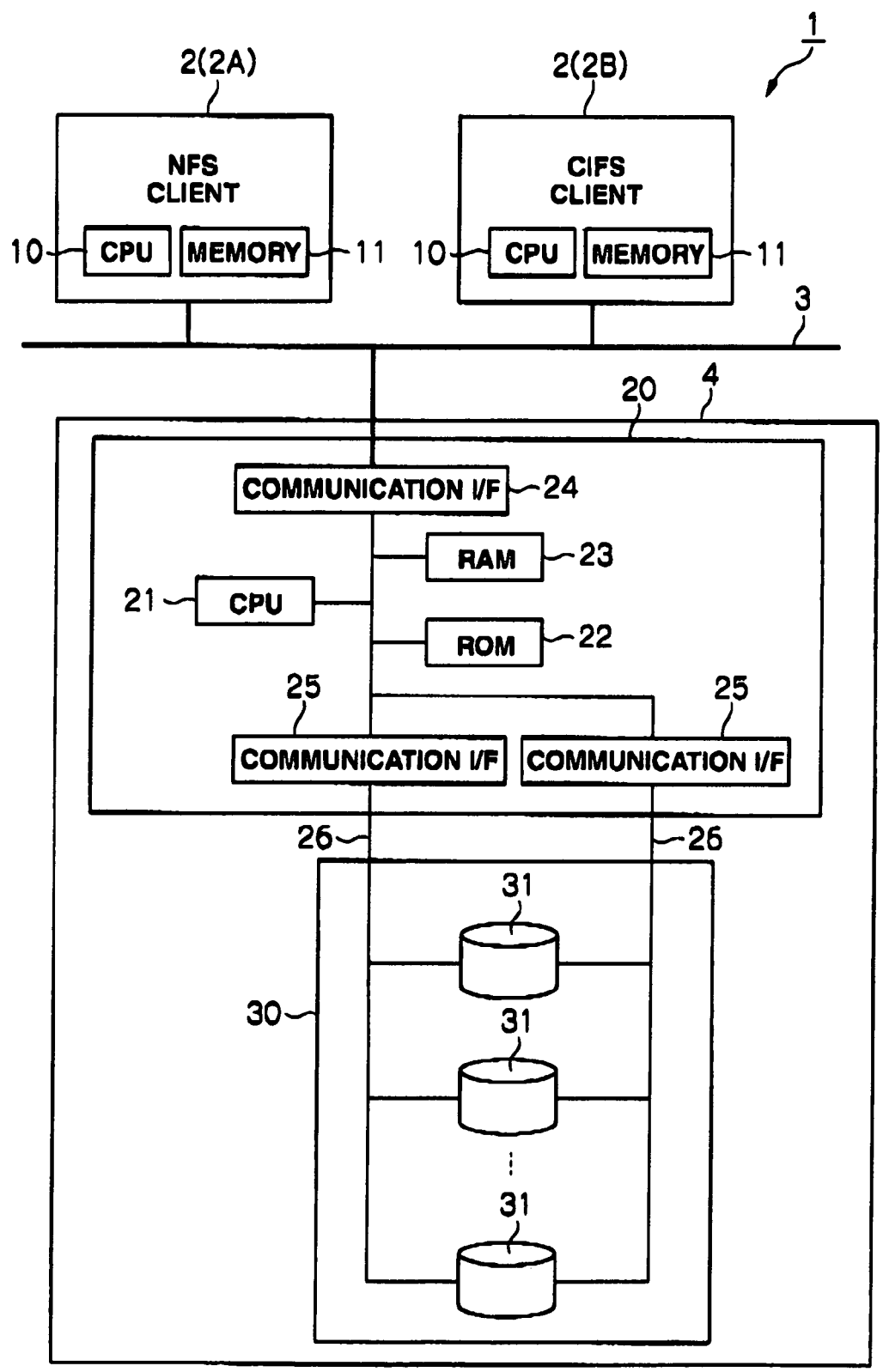
FIG. 1 is a block diagram illustrating a storage system according to an embodiment of the present invention.

(1) Configuration of a Storage System According to an Embodiment of the Present Invention In FIG. 1, reference numeral 1 represents an entire storage system according to the embodiment. The storage system 1 is configured by connecting a plurality of client apparatuses 2 to a storage apparatus 4 via a network 3.

Each client apparatus 2 is for using a file-sharing service provided by the storage apparatus 4, and is a computer apparatus that includes information-processing resources like a CPU (Central Processing Unit) 10, and memory 11. For the client apparatus 2, an NFS client apparatus 2A having an NFS (Network File System®) on the UNIX® OS (operating system), or a CIFS client apparatus 2B having a CIFS (Common Internet File System®) on the Windows® OS can be used.

The network 3 may be a LAN (Local Area Network), the Internet, a public line, or a dedicated line. Communication between the client apparatuses 2 and the storage apparatus 4 via the communication network 3 is conducted according to TCP/IP (Transmission Control Protocol/Internet Protocol).

The storage apparatus 4 is configured as NAS, and provides a file-sharing service that can conform to many kinds of file access protocols such as NFS and CIFS, etc. The storage apparatus 4 includes a control unit 20, which is also referred to as a NAS head, and a storage unit 30 having a plurality of storage devices 31.

The control unit 20 includes a CPU 21 that controls the overall operation of the storage apparatus 4, ROM (Read Only Memory) 22 storing various programs therein, RAM (Random Access Memory) 23 that is used as work memory for the CPU 21, and first and second communication interfaces 24 and 25. The first communication interface 24 functions as a front-end communication interface that transmits/receives data to/from the client apparatuses 2 via the network 3. The second communication interface 25 functions as a back-end communication interface that transmits/receives data to/from the storage unit 30 via communication networks 26A and 26B such as SANs (Storage Area Networks).

The CPU 21 interprets commands received from a client apparatus 2 based on a control program stored in the ROM 22, and executes processing based on these commands.

The storage devices 31 in the storage unit 30 may be expensive disks such as SCSI (Small Computer System Interface) disks, or inexpensive disks such as SATA (Serial ATA Attachment) disks or optical disks. These storage devices 31 can be managed by the control unit 20 with the RAID system. One or more logical volumes are defined over a physical storage area provided by a RAID group consisting of one or more storage devices 31. Data transmitted from a client apparatus 2 is stored in these volumes in block units of predetermined size.

Each logical volume is assigned its own inherent identifier (LUN: Logical Unit Number). In this embodiment, data input/output is performed by designating an address that is a combination of the identifier and an inherent number assigned to each block (LBA: Logical Block Number).

For redundancy, each storage device 31 is connected to the control unit 20 via the dual communication networks 26A and 26B. Consequently, in this storage apparatus 4, even if a failure occurs in one of the communication networks 26A and 26B, the control unit 20 can access the storage devices 31 via the other communication network 26B or 26A.

FIG. 1 shows the case where the storage unit 30 is provided in the storage apparatus 4. However, all or part of the storage unit 30 may be provided outside the chassis of the storage apparatus 4. For example, a disk array apparatus having multiple storage devices 31 arranged in an array can be used as a storage unit.

Next, data input/output to/from the storage apparatus 4 of the storage system 1 is explained below. A CPU 10 in a client apparatus 2, upon user input of an instruction to write file data, sends a data write request and write data to the storage apparatus 4 via the network 3.

The CPU 21 in the storage apparatus 4, upon receipt of the data write request and write data, controls the storage unit 30 based on this data write request to write the write data to the designated address in the relevant storage devices 31.

The CPU 10 in the client apparatus 2, upon user input of an instruction to read file data, sends a data read request to the storage system 4 via the network 3.

The CPU 21 in the storage apparatus 4, upon receipt of this data read request, controls the storage unit 30 based on this data read request to read the relevant file data from the designated address in the relevant storage device 31, and sends it to the client apparatus 2 via the network 3.

(2) File Search System in the Storage System (2-1) Table Configurations

Next, the file search system in the storage system 1 is explained below. In the storage system 1 according to this embodiment, a virtual file tree can be set by each user for the storage apparatus 4, so that each user can search for a desired file in accordance with the virtual file tree set by himself/herself.

Figure 2:
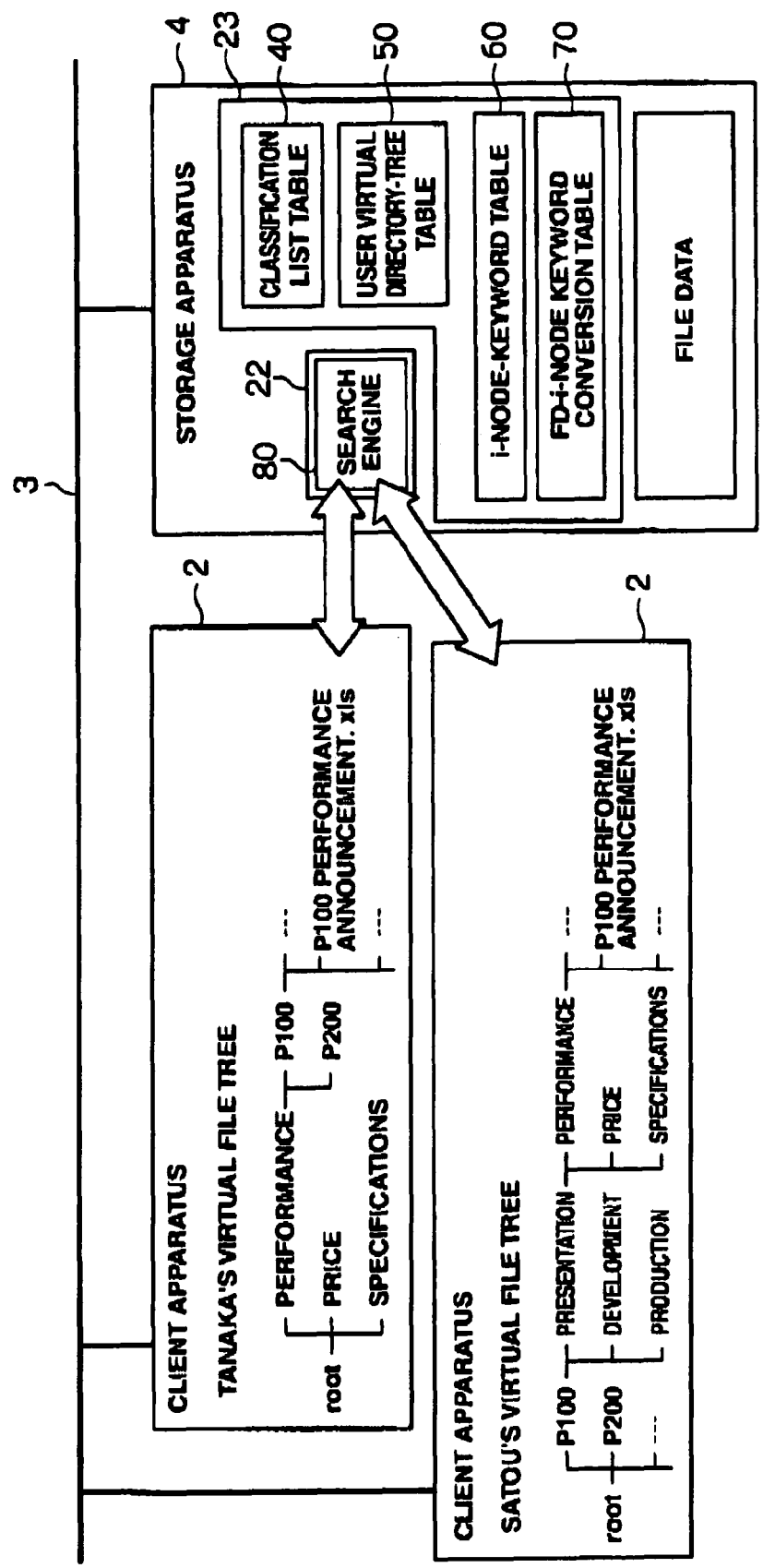
FIG. 2 is a conceptual diagram provided to explain the internal configuration of a storage apparatus, and virtual file trees.

As the means for conducting the above, the storage apparatus 4, as shown in FIG. 2, has a classification list table 40, user virtual directory table 50, i-node—keyword table 60, and fd (file descriptor)—i-node conversion table 70 in the RAM 23, and a search engine 80 in the ROM 22.

The classification list table 40 is a table for managing the classification lists described later, and as shown in FIG. 3, has a "classification list number" field 41, a "classification list name" field 42, and a "classification keyword" field 43. The "classification keyword" field 43 stores the attributes of users' data files (hereinafter, referred to as "keywords") in the categories into which the attributes have been classified, and the "classification list name" field 42 stores the name of the list containing the keywords belonging to each of the categories (hereinafter, referred to as "classification list").

For example, in the case of FIG. 3, the attributes of the files are classified into the main classification lists, i.e., "period," "product series," "product attributes," and "business affairs." FIG. 3 shows that the "period" classification list contains the keywords "2004," "2005" and "2006"; the "product series" classification list contains the keywords "P100" and "P200"; the "product attributes" classification list contains the keywords "performance," "price" and "specifications"; and the "business affairs" classification list contains the keywords "presentation," "development" and "production."

The "classification list number" field 41 in the classification list table 40 stores entry numbers respectively corresponding to the classification lists (hereinafter, referred to as "classification list number(s)").

Meanwhile, the user virtual directory table 50 is a table for managing virtual file trees set by users, and as shown in FIG. 4, has a "user" field 51, and a "classification list number" field 52.

The "user" field 51 stores the names of the users who have set the virtual file trees. The "classification list number" field 52 is divided into three fields, i.e., a "first-tier" field 53, a "second-tier" field 54, and a "third-tier" field 55. The kinds of classification lists (classification list numbers) set by each user for the first to third tiers of his/her virtual file tree are respectively stored in the fields 53 to 55.

For example, in the example shown in FIG. 4, a user, "Tanaka," has set a classification list named "product attributes," whose classification number is "#003," for the first tier of a virtual file tree, and set a classification list named "product series," whose classification list number is "#002," for the second tier. Accordingly, in the "Tanaka" virtual file tree, as shown in FIG. 2, "performance," "price," and "specifications" exist as subdirectories of the "root," and "P100" and "P200" exist as sub-subdirectories. Files (e.g., "P100 performance announcement.xls") are stored in the directories "P100" and "P200."

In the example shown in FIG. 4, a user, "Satou," has set a classification list named "product series," whose classification list number is "#002," for the first tier of a virtual file tree, set a classification list named "business affairs," whose classification list number is "#004," for the second tier, and also set a classification list named "product attributes," whose classification list number is "#003," for the third tier. Accordingly, in the "Satou" virtual file tree, as shown in FIG. 2, "P100" and "P200" exist as subdirectories of the "root," and "presentation," "development," and "production" exist as sub-subdirectories. Files (e.g, "P100 performance announcement.xls) are stored in these "performance," "price" and "specifications" directories.

Meanwhile, the i-node—keyword table 60 is a table for managing i-node information on each file and keywords associated with the file, and all of the files stored in the storage apparatus 4 are registered in the table 60.

The i-node—keyword table 60, as shown in FIG. 5, includes an "i-node number" field 61, an "i-node information" field 62 and a "file keyword" field 63. The "i-node information" field 62 stores the name, owner, file size, file address, and last update time, etc., of a file, and the "i-node number" field 61 stores the i-node number assigned to the file.

The "file keyword" field 63 stores the names of all of the directories (i.e., the keywords explained above in relation to FIG. 3) in the file path in the tiers above the file in a virtual file tree set by a user. For example, in the example shown in FIG. 2, the virtual file tree set by "Tanaka" stores the directory named "P100" in the directory named "performance," and the directory named "P100" further stores the file named "P100 performance announcement.xls." Accordingly, the keywords "P100" and "performance" are stored in the "file keyword" field 63 for the file named the "P100 performance announcement.xls."

In the virtual file tree set by "Satou," the file named "P100 performance announcement.xls" is stored in the directory named "performance." This directory is stored in the directory named "presentation," and the "presentation" directory is further stored in the directory named "P100." Therefore, the "file keyword" field 63 for the file stores the keyword "presentation," in addition to the keywords "P100" and "performance."

The "file keyword" field 63 also stores a file series number, which is identification information provided to a new file when it is created. A separate number is provided to each new file as a file series number.

The fd—i-node conversion table 70 is a table for associating file descriptors and i-nodes with each other, and includes a "file descriptor" field 71 and an "i-node or keyword list" field 72. The "i-node or keyword list" field 72 stores an i-node number for a directory or file, or keywords related to the directory or file. The "file descriptor" field 72 shows the file descriptor assigned to the directory or file.

In the example shown in FIG. 6, a file descriptor "10002" is assigned to the directory named "performance" in the virtual file tree set by "Tanaka," and a file descriptor "10003" is assigned to the directory named "P100" ("performance, P100") in a tier lower than the directory named "performance."

(2-2) File Read Processing in the Storage System

Next, file read processing in the storage system 1 according to this embodiment is explained below. First, file read processing in a conventional storage system will be explained.

Figure 7:
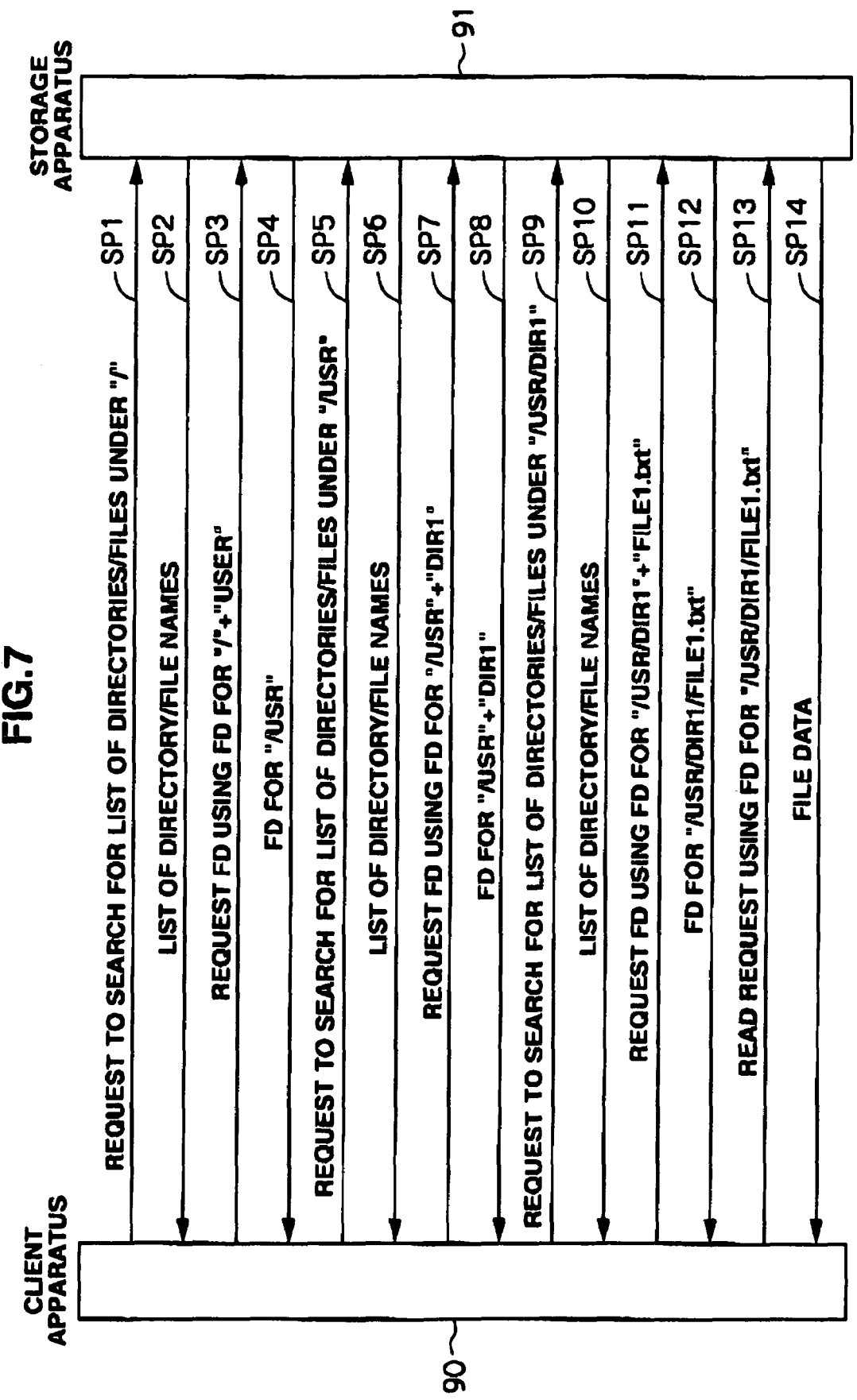
FIG. 7 is a flowchart provided to explain file read processing in a storage system having a conventional configuration.

FIG. 7 is a flowchart indicating a series of processes until a user accesses a desired file stored in a storage apparatus 91 having a conventional configuration via a client apparatus 90 in a storage system with a conventional configuration. In the example shown in FIG. 7, as shown in FIG. 8, directories, "usr," "bin," and "etc," exist as subdirectories of the root directory ("root"), "dir1" and "dir2" exist as subdirectories of "user," and files like "file1.txt" are stored in "dir1."

Figures 8, 9, 10:
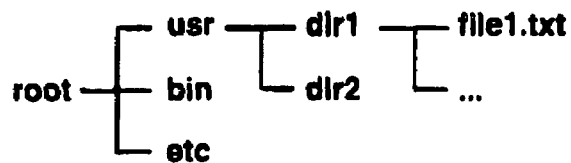
FIG. 8 is a conceptual diagram provided to explain file read processing in the storage system having a conventional configuration.
FIG. 9 is a conceptual diagram illustrating an i-node management table in the storage system having a conventional configuration.
FIG. 10 is a conceptual diagram provided to explain file read processing in the storage system having a conventional configuration.

The conventional storage apparatus 91 has an i-node management table 92, as shown in FIG. 9, for managing i-node information for each directory or file, and an fd—i-node conversion table, as shown in FIG. 6, for managing file descriptors. The i-node management table 92 stores i-node numbers and the corresponding i-node information. As shown in FIG. 10, the directory name and i-node number of each subdirectory stored in the corresponding directory, and the file data for a file stored in that directory are stored at an address included in this i-node information.

For example, in the examples shown in FIGS. 9 and 10, the content of the directory with the i-node number "2" is stored at the address "aaa" where the information explaining that "usr," "bin," and "etc" exist as subdirectories of the directory with the i-node number "2" and that the i-node numbers for these subdirectories are "10," "20," and "30," respectively is stored. Upon searching the i-node management table 92 with reference to these i-node numbers, it turns out that the address of the "usr" directory is "bbb" where the information explaining that directories, "dir1" and "dir2," exist as subdirectories of the "usr (/usr)" directory and that the i-node numbers for these subdirectories are "100" and "200," respectively is stored.

In the above conventional storage system, a user, when accessing the file named "file1.txt," inputs an instruction to search directories and files in the tiers under "/(root directory)" to a client apparatus 90. Consequently, the client apparatus 90 sends a request to search the directories and files to the storage apparatus 91 (SP1). The storage apparatus 91, upon receipt of this search request, referring to the i-node management table 92, reads the content of the "/" directory from the relevant address, and then sends a list containing the directory names of directories "usr," "bin," and "etc" that are stored in the read content to the client apparatus 90 (SP2), and the content of the list is displayed on a client apparatus 90 display.

Next, the user inputs, via the client apparatus 90, an instruction to search directories and files in the tiers under "usr". Consequently, the client apparatus 90 sends a request to transfer a file descriptor for "/usr" to the storage apparatus 91 together with the file descriptor for "/," and the directory name of "usr" (SP3). The storage apparatus 91, upon receipt of this transfer request, assigns a file descriptor to the "/usr" directory, and registers the file descriptor in an fd—i-node conversion table in relation to the "/usr" directory. The CPU sends the file descriptor assigned to the "/usr" directory to the client apparatus 90 (SP4).

The client apparatus 90, upon receipt of this descriptor, sends a search request to search directories and files in the tiers under "/usr" to the storage apparatus 91 (SP5). The storage apparatus 91, upon receipt of this search request, referring to the i-node management table 92, reads the content of the "usr" directory from the relevant address, and then sends a list containing the directory names of directories "dir1" and "dir2" that are stored in the read content to the client apparatus 90 (SP6), and the content of the list is shown on the client apparatus 90 display.

Next, the user uses inputs, via the client apparatus 90, an instruction to search directories and files in the tiers under "dir1." Consequently, the client apparatus 90 sends a request to transfer a file descriptor for "/usr/dir1" to the storage apparatus 91 together with the file descriptor for "/usr," and the directory name of "dir1" (SP7). The storage apparatus 91, upon receipt of this transfer request, assigns a file descriptor to the "/usr/dir1" directory, and registers the file descriptor in the fd—i-node conversion table in relation to the "/usr/dir1" directory. The CPU sends the file descriptor assigned to this "/usr/dir1" directory to the client apparatus 90 (SP8).

The client apparatus 90, upon receipt of this file descriptor, sends a request to search directories and files in the tiers under "/usr/dir1" to the storage apparatus 91 using this file descriptor (SP9). The storage apparatus 91, upon receipt of this search request, referring to the i-node management table 92, reads the content of the "dir1" directory from the relevant address, and then sends a list containing the file names of the files that are stored in the read content (including "file1.txt") to the client apparatus 90 (SP10), and the content of the list is displayed on the client apparatus 90 display.

Then the user inputs, via the client apparatus 90, an instruction to read the "file1.txt" data. Consequently, the client apparatus 90 sends a request to transfer a file descriptor for "/usr/dir1/file1.txt" to the storage apparatus 91 (SP11). The storage apparatus 91, upon receipt of this transfer request, assigns a file descriptor to "/usr/dir1/file1.txt," and registers the file descriptor in the fd—i-node conversion table in relation to the "/usr/dir1/file1.txt" file. The CPU sends the file descriptor assigned to this "/usr/dir1/file1.txt" to the client apparatus 90 (SP12).

The client apparatus 90, upon receipt of this file descriptor, sends a request to read "/usr/dir1/file1.txt" to the storage apparatus 91 using this file descriptor (SP13). Based on this read request, the storage apparatus 91 reads the "file1.txt" data from the relevant address, and sends it to the client apparatus 90 (SP14), and the content of "file1.txt" based on this file data is displayed on the client apparatus 90 display.

Figure 11:
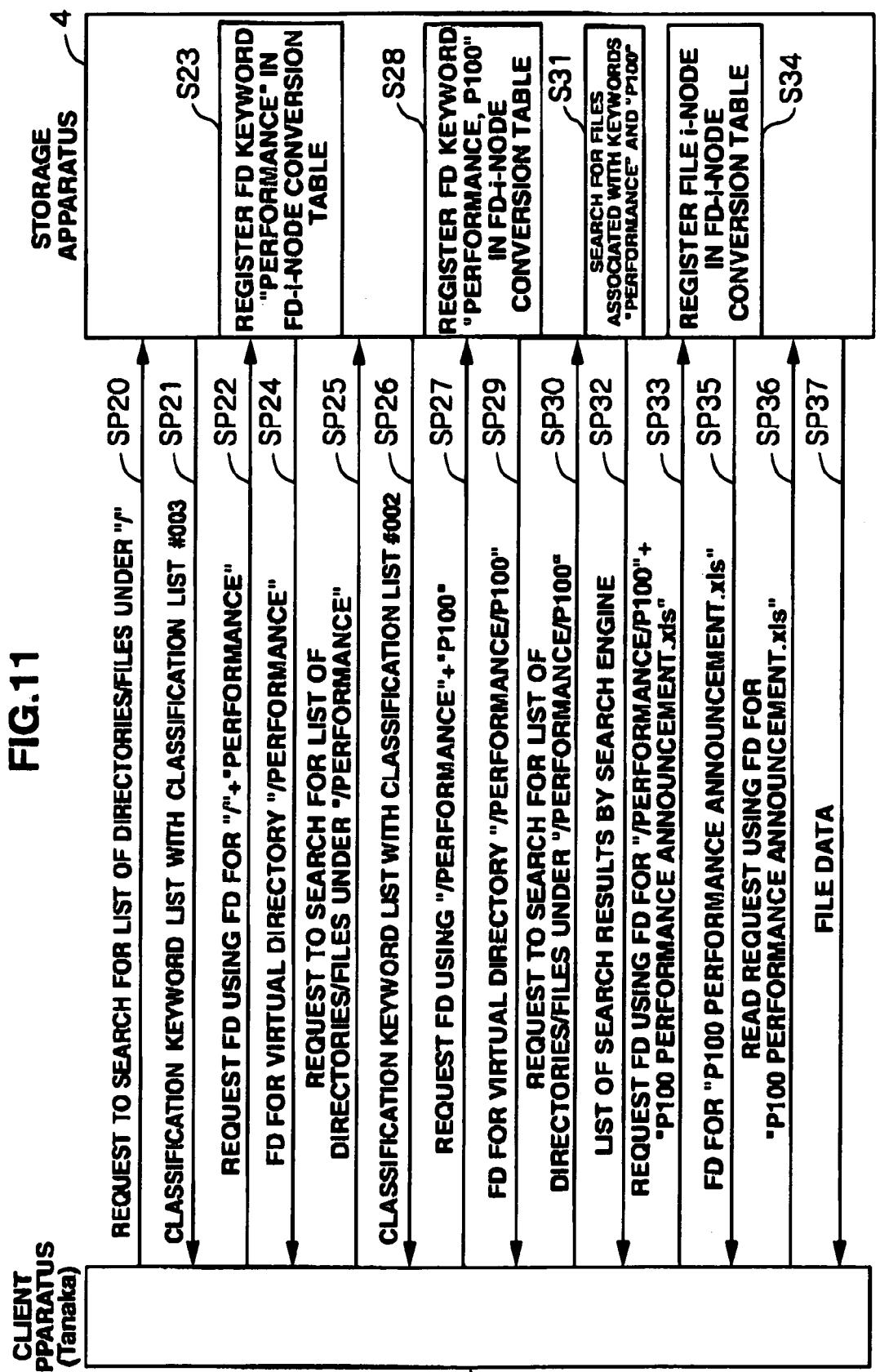
FIG. 11 is a flowchart provided to explain file read processing in a storage system according to the embodiment of the present invention.

FIG. 11 is a flowchart indicating a series of processes until a user accesses a desired file stored in the storage apparatus 4 via the client apparatus 2 in the storage system 1 according to this embodiment. In the example shown in FIG. 11, the user is "Tanaka," and the virtual file tree shown in FIG. 2 is set by "Tanaka." Accordingly, the i-node—keyword conversion table 60 retained by the storage apparatus 4 has the same content as that shown in FIG. 5.

Figures 12, 15:
FIG. 12 is a conceptual diagram provided to explain file read processing in a storage system according to the embodiment of the present invention.
FIG. 15 is a flowchart provided to explain a file copy function in a storage system.

In this storage system 1, no storage area storing information indicating the content of each directory, which corresponds to the storage area for the address "aaa," "bbb," or "ccc" in FIG. 10, exists within the storage apparatus 4, only file data for each file as shown in FIG. 12.

Under the aforementioned conditions, the user "Tanaka," when accessing a file named "P100 performance announcement.xls.," inputs an instruction to search directories and files in the tiers under "/(root directory)" to the client apparatus 2. Consequently, the CPU 10 (FIG. 1) in the client apparatus 2 sends the directory and file search request to the storage apparatus 4 (SP20).

The CPU 21 (FIG. 1) in the storage apparatus 4 is already aware of the user being "Tanaka," based on the user's input at the time of log-in, and upon receipt of the search request, referring to the classification list table 40, and the user virtual directory table 50, sends the classification list with the classification list number "#003" that has been set by "Tanaka" for first tier directories, i.e., a list containing "product attributes" keywords to the client apparatus 2 (SP21).

In this example, since keywords such as "performance," "price," and "specifications" are included in the "product attributes," the storage apparatus 4 sends to the text strings of these keywords to the client apparatus 2, and the client apparatus 2, upon receipt of the text strings of the keywords, displays them on the display as the directory names of directories in the first tier of the virtual file tree.

Subsequently, the user inputs, via the client apparatus 2, an instruction to search directories and files in the tiers under "performance". As a result, the CPU 10 in the client apparatus 2 sends a request to transfer a file descriptor for "/performance" to the storage apparatus 4 together with the file descriptor for "/" and the directory name of "performance" (SP22). The CPU 21 in the storage apparatus 4, upon receipt of this transfer request, assigns a file descriptor for the "/performance" directory, and registers this file descriptor in the fd—i-node conversion table 70 (FIG. 6) in relation to the keyword "performance" (SP23). The CPU 21 sends the file descriptor assigned to the "/performance" directory to the client apparatus 2 (SP24).

The CPU 10 in the client apparatus 2, upon receipt of this descriptor, sends a request to search directories and files in the tiers under "/performance" to the storage apparatus 4 using this file descriptor (SP25). The CPU 21 in the storage apparatus 4, upon receipt of this search request, referring to the classification list table 23 and the user virtual directory table 50, sends the classification list with the classification list number "#002" set by "Tanaka" for second tier directories, i.e., a list containing "product series" keywords, to the client apparatus 2 (SP26).

In this example, since keywords like "P100" and "P200" are from "product series," the CPU 10 in the client apparatus 2 sends the text strings of these keywords to the client apparatus 2, and the client apparatus 2, upon receipt of the text strings, displays them on the display as the directory names of the directories in the second tier of the file tree.

Subsequently, the user inputs, via the client apparatus 2, an instruction to search directories and files in the tiers under "P100." As a result, the CPU 10 in the storage apparatus 2 sends a request to transfer a file descriptor for "/performance/P100" to the storage apparatus 4 together with the file descriptor for "/performance," and the directory name "P100" (SP27).

The CPU 21 in the storage apparatus 4, upon receipt of this transfer request, assigns a file descriptor to "/performance/P100," and registers the file descriptor in the fd—i-node conversion table 70 (FIG. 6) in relation to the directory names (i.e., keywords) of all the directories existing in the path from the current directory to the root directory (SP28). Accordingly, in this example, the file descriptor is registered in the fd—i-node conversion table 70 in relation to the keywords "performance" and "P100." The CPU 21 sends the file descriptor assigned to this "/performance/P100" to the client apparatus 2 (SP29).

The CPU 10 in the client apparatus 2, upon receipt of the descriptor from the storage apparatus 4, sends a request to search directories and files in the tiers under "/performance/P100" to the storage apparatus 4 using this file descriptor (SP30).

Here, in the virtual file tree set by "Tanaka," no directories exist in the tiers under "/performance/P100," only files.

Therefore, the CPU 21 in the storage apparatus 4 activates the search engine 80 (FIG. 2) to read the keywords (in this example, "performance" and "P100") associated with the file descriptor received from the client apparatus 2 from the fd—i-node conversion table 70, and also to search for files associated with these keywords in the i-node—keyword conversion table 60 (i.e., the keywords stored in its "file keyword" field 63) (SP31).

The CPU 21 in the storage apparatus 4 sends a list containing the text strings of the file names of all the files found in the above search (including "P100 performance announcement.xls") to the client apparatus 2 (SP32), and the content of the list is displayed on the client apparatus 2 display.

Subsequently, the user inputs, via the client apparatus 2, an instruction to read the "P100 performance announcement.xls" data. As a result, the CPU 10 in the client apparatus 2 sends a request to transfer a file descriptor for "/performance/P100/P100 performance announcement.xls" to the storage apparatus 4 together with the file descriptor for "/performance/P100" (SP33).

The CPU 21 in the storage apparatus 4, upon receipt of this transfer request, assigns a file descriptor to "P100 performance announcement.xls," and registers this file descriptor in the fd—i-node conversion table 70 in relation to the i-node number for "P100 performance announcement.xls" (SP34). Accordingly, in the example shown in FIG. 11, the file descriptor is registered in the fd—i-node conversion table 70 in relation to the i-node number "16" (see FIG. 6). The CPU 21 sends the file, descriptor assigned to this "P100 performance announcement.xls" to the client apparatus 2 (SP35).

The CPU 10 in the client apparatus 2, upon receipt of this file descriptor, sends a request to read "P100 performance announcement.xls" to the storage apparatus 4 using the file descriptor (SP36). Based on this read request, the CPU 21 in the storage apparatus 4 reads the "P100 performance announcement.xls" data, and sends it to the client apparatus 2 (SP37), and the content of "P100 performance announcement.xls" based on the file data is displayed on the client apparatus 2 display.

(2-3) Virtual File Tree Customization Function

Next, the virtual file tree customization function of the storage system 1 is explained below. In the storage system 1, the client apparatuses each have a control program for changing the directory structure (hereinafter, referred to as "directory definition customization program") so that each user can freely change his/her own virtual directory tree structure using his/her client apparatus 2.

Figure 13:
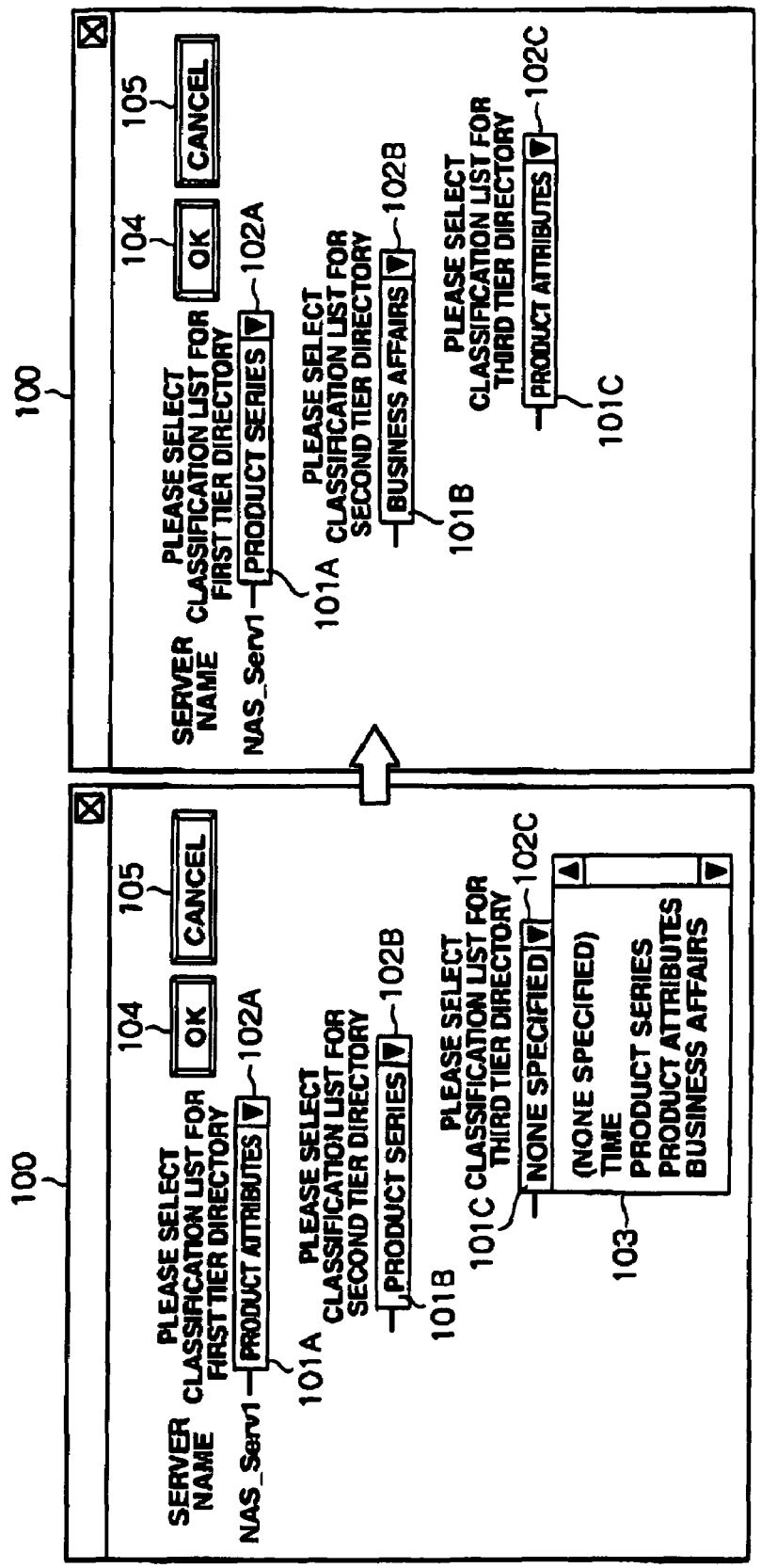
FIG. 13 is a plain view provided to explain a directory structure customization screen.

FIG. 13 shows a GUI (Graphical User Interface) screen 100 (hereinafter, referred to as "directory structure customization screen") shown on a client apparatus 2 display when the directory definition customization program is activated. In this directory structure customization screen 100, first to third classification list display boxes 101A to 101C are displayed in relation to the first to third tiers of a virtual file tree that can be set in this storage system 1.

The CPU 10 in the client apparatus 2, upon the directory definition customization program being activated, communicates with the storage apparatus 4 to read the first to third tier classification lists of the virtual file tree currently set for the user using the client apparatus 2 (in the example shown in FIG. 13, "Tanaka") from the user virtual directory table 50 (FIG. 2), and displays the names of the first to third tier classification lists (classification list names) obtained through the above process in the corresponding first to third classification list display boxes 101A to 101C in the directory structure customization screen 100, In this case, for a tier in which no classification lists are set, the CPU 10 shows "(none specified)" in the classification display box, from among the first to third classification list display boxes 101A to 101C, corresponding to the tier.

The right side of each of the first to third classification list display boxes 101A to 101C in the directory structure customization screen 100 shows menu buttons 102A to 102C. In the directory structure customization screen 100, selectable classification lists then registered in the storage apparatus 4 (including "(none specified)") can be displayed in a pull-down menu 103 by clicking the menu button 102A, 102B, or 102C.

The user can freely select a desired list from among the group of the classification lists displayed in the pull-down menu 103 using a mouse, and the selected classification list is shown in the relevant classification list display box 101A, 101B, or 101C.

The user makes a desired classification list name be displayed in each of the first to third classification list boxes 101A to 101C which correspond to the first to third tiers through the same process, and then clicks the "OK" button 104 displayed in the upper right portion of the directory structure customization screen 100.

The CPU 10 in the client apparatus 2 sends the first to third classification lists of the virtual file tree set using this directory structure customization screen 100 as the set virtual file tree information to the storage apparatus 4 together with a request to update the user virtual directory table 50. The CPU 21 in the storage apparatus 4, upon receipt of this update request, updates the user's entries in the user virtual directory table 50 in accordance with the set virtual file tree information provided with the update request. Consequently, the user's virtual file tree is updated to one having the structure then set by the user.

The CPU 10 in the client apparatus 2, when the cancel button 105 appearing in the upper right portion of the directory structure customization screen 100 is clicked after the first to third classification lists of a virtual file tree in the directory structure customization screen 100 are set by the user's inputs, clears the content of the settings then made in the directory structure customization screen 100. Accordingly, in this case, the user's entries in the user virtual directory table 50 retained in the storage apparatus 4 will not be updated.

(2-4) File Copy Function

FIG. 14 is a flowchart showing processing executed in a client apparatus 2 and the storage apparatus 4 when a file in the storage apparatus 4 is copied according to a user's instruction. FIG. 14 shows an example in which a file named "P100 performance announcement.xls" is the copy source (hereinafter, referred to as the "copy source file").

The CPU 10 in the client apparatus 2 first sends a request to transfer the file attributes of the copy source file (hereinafter, referred to as "file attribute transfer request") to the storage apparatus 4 (SP40). The CPU 21 in the storage apparatus 4, upon receipt of this file attribute transfer request, sends file attribute information representing the file attributes of the copy source file to the client apparatus 2. The Items included in the file attributes vary depending on the implementation of the product. However, in this embodiment, i-node information (file name and address, etc.) stored in the "i-node information" field 62 (FIG. 5), and the file series number ("#12345") stored in the "file keyword" field 63 (FIG. 5) from among the entries for the copy source file in the i-node—keyword table 60 (FIG. 5) are sent to the client apparatus 2 as the file attribute information (SP41).

The CPU 10 in the client apparatus 2, upon receipt of the file attribute information, sends a request to transfer the copy source file data (hereinafter, referred to as the "file data transfer request") to the storage apparatus 4 (SP42). The CPU 21 in the storage apparatus 4, upon receipt of this file data transfer request, reads the copy source file data from the relevant logical volume, and sends it to the client apparatus 2 (SP43).

The CPU 10 in the client apparatus 2, upon receipt of the copy source file data, sends a request to create a new file in the same directory as the one where the copy source file is stored (hereinafter, referred to as "new file creation request") to the storage apparatus 4 together with the file descriptor for the directory ("/performance/P100") where the copy source file is stored, and the file name of the new file (SP44).

In this embodiment, a file name with the letter string "update" attached to the file name of the copy source file is provided to the new file. If the file name for the copy source file is "P100 performance announcement.xls" as shown in FIG. 14, the file name "P100 performance announcement update.xls" is provided as the file name for the new file.

The CPU 21 in the storage apparatus 4, upon receipt of this new file creation request, creates a new file, and registers i-node information for the new file in the i-node—keyword table 60 (SP45). Specifically, the CPU 21 writes information like the file name of the new file obtained through step SP44, and the owner of the file, in the "i-node information" field 62 (FIG. 5) of the i-node—keyword table 60 (FIG. 5) as the i-node information for the new file.

The CPU 21 searches the fd—i-node conversion table 70 based on the file descriptor for the directory storing the copy source file obtained through step SP44 to obtain the keywords ("performance" and "P100") associated with the file descriptor, and stores them in the "file keyword" field 63 (FIG. 5) as an entry for the new file in the i-node—keyword table 60 (SP46).

The CPU 21 assigns a file descriptor to the new file, and as shown in FIG. 15, registers the file descriptor in the fd—i-node conversion table 70 in relation to the i-node number ("17") for the new file in the i-node—keyword table 60 (SP47). The CPU 21 then sends the file descriptor assigned to the new file to the client apparatus 2 (SP48).

Upon receipt of the file descriptor for the new file, the CPU 10 in the client apparatus 2, using the file descriptor, sends the copy source file data obtained through step SP43 to the storage apparatus 4 together with a request to update the new file created by the storage apparatus 4 at step SP45 (SP49). The CPU 21 in the storage apparatus 4, upon receipt of the update request, writes the file data received together with the update request over the file created at step SP45 (SP50). Consequently, a copy of the copy source file is created in the same directory as the one where the copy source file in the storage apparatus 4 is stored.

With the sending of the file data, the CPU 10 in the client apparatus 2 sends the file attribute information on the copy source file obtained through step SP41 to the storage apparatus 4 together with a request to update the file attribute information on the new file, using the file descriptor for the now file obtained through step SP48 (SP51). As described above, this file attribute information contains the i-node information and file series number ("#12345") for the copy source file.

The CPU 21 in the storage apparatus 4, upon receipt of the file attribute information, extracts the file series number for the copy source file contained in the file attribute information, and as shown in FIG. 16, stores this file series number in the "file keyword" field 63 (FIG. 5) as an entry for the new file in the i-node—keyword conversion table 60 (FIG. 5) (SP52). Since i-node information generally includes the last update time for the relevant file, when the file attribute information on a new file is updated, the last update time contained in the file attribute information on the new file will also be updated.

(2-5) File Search Support Function

As described above, in the storage system 1, when copy of a file is performed, the directory names of all of the directories existing in the file path in the tiers above the copy source file in the virtual file tree for the user that has conducted the copy are registered as keywords for the new file. Accordingly, the user that has conducted the copy can access the new file through the same route as that to the copy source file in the virtual file tree set by the user.

However, according to the above method, the directory name for a directory existing in the path for the new file in the tiers above the new file in the virtual file tree set by another user is not always associated with the new file as a keyword.

In the examples shown in FIGS. 2 and 11, a new file named "P100 performance announcement update.xls" created by "Tanaka" is associated with the directory names of directories "performance" and "P100" existing in the tiers above that file in the virtual file tree set by "Tanaka" as keywords, while in the virtual file tree set by "Satou," the directory name of the directory "presentation" existing in the tiers above "P100 performance announcement.xls," which is the copy source file, is not associated as a keyword for the file.

Consequently, in the storage system 1, the situation will arise in which a user cannot access a file created by another user through the same route as that to its copy source file.

Therefore, this storage system 1 has a file search support function to support user file searching, so that when a user has performed copy of a file to a new file, even another user, one that has set a virtual file tree having a structure that is entirely different from that of the virtual file tree set by the user that has performed the copy, can access the new file.

This embodiment has three file search modes: a same keyword search mode, an old version search mode, and a new version search mode, as ones during execution of the file search support function.

The same keyword search mode is a file search mode that uses all the keywords except the file series number for the file that is the reference of the search at that time (hereinafter, referred to as the "reference file") as search keywords to search for file(s) associated with all of these keywords.

The old version search mode is a file search mode that uses the file series number for the reference file as a search keyword to search for file(s) with its last update time prior to the last update time of the reference file from among the files associated with that file series number.

The new version search mode is a file search mode that uses the file series number for the reference file as a search keyword to search for file(s) with its last update time subsequent to the last update time of the reference file from among the files associated with that file series number.

In the storage system 1, it is possible to select one file (hereinafter, referred to as the "reference file") through mouse movements when the user's virtual file tree is displayed on a client apparatus 2 display as shown in FIG. 17, and then to display a window 110 (hereinafter, referred to as the "search mode menu window") that displays the mode names for the three search modes as shown in FIG. 18 by clicking the right mouse button.

Consequently, the user can select a desired search mode from among these three search modes displayed in the search mode menu window 110. As a result, file search processing according to the selected file search mode is executed in the storage apparatus 4, and the search-results are displayed on the client apparatus 2 display.

In this case, when a user selects the old version search mode or the new version search mode, a window 111, as shown in FIG. 19, to ask the user whether or not to add search keywords other than the file series number for the reference file (hereinafter, referred to as the "additional search keyword window") is shown in the client apparatus 2 display.

Here, FIG. 19 shows an example of the window 111 when the file "P100 performance announcement.xls" is designated by "Tanaka" as the reference file. As shown in FIG. 2, in the virtual file tree set by "Tanaka," the directories "performance" and "P100" exist in the tiers above "P100 performance announcement.xls." Meanwhile, "presentation" also exists as a keyword for "P100 performance announcement.xls", in addition to "performance" and "P100."

In this case, keywords ("performance" and "P100") representing the directory names of the directories existing in the tiers above the object file in the user's virtual file tree are displayed in the additional search keyword window 111 in the state where they are already selected (in which check marks 121 are placed in the corresponding check boxes 120), and the keyword "presentation" is separately displayed in an unselected state (in which a check mark 121 is not placed in the corresponding check box 120).

In the additional search window 111, a keyword with the check mark 121 displayed in the corresponding check box 120 can be changed to an unselected state by clicking the check box 120 to remove the check mark 121. A keyword with a check mark 121 not displayed in the corresponding check box 120 can be changed to a selected state by clicking the check box 120 to display a check mark 121.

Thus, the user sets keywords that he/she wishes to include as additional search keywords from among the keywords displayed in the additional search keyword window 111, and then clicks the OK button 122 displayed in the additional search key word window 111. This makes it possible to make the storage apparatus 4 conduct file searching including these keywords as search keywords. If no search keywords are to be added, the user sets all the keywords displayed in the additional search keyword window 111 to an unselected state, and clicks the OK button 122. This makes it possible to make the storage apparatus 4 conduct file searching with only the file series number for the object file used as a search keyword.

If the user wishes to cancel file searching according to the old version search mode or the new version search mode, he/she may click the cancel button 123 displayed in the additional search keyword window 111 to cancel the file searching and close the additional search keyword window 111.

Figure 20:
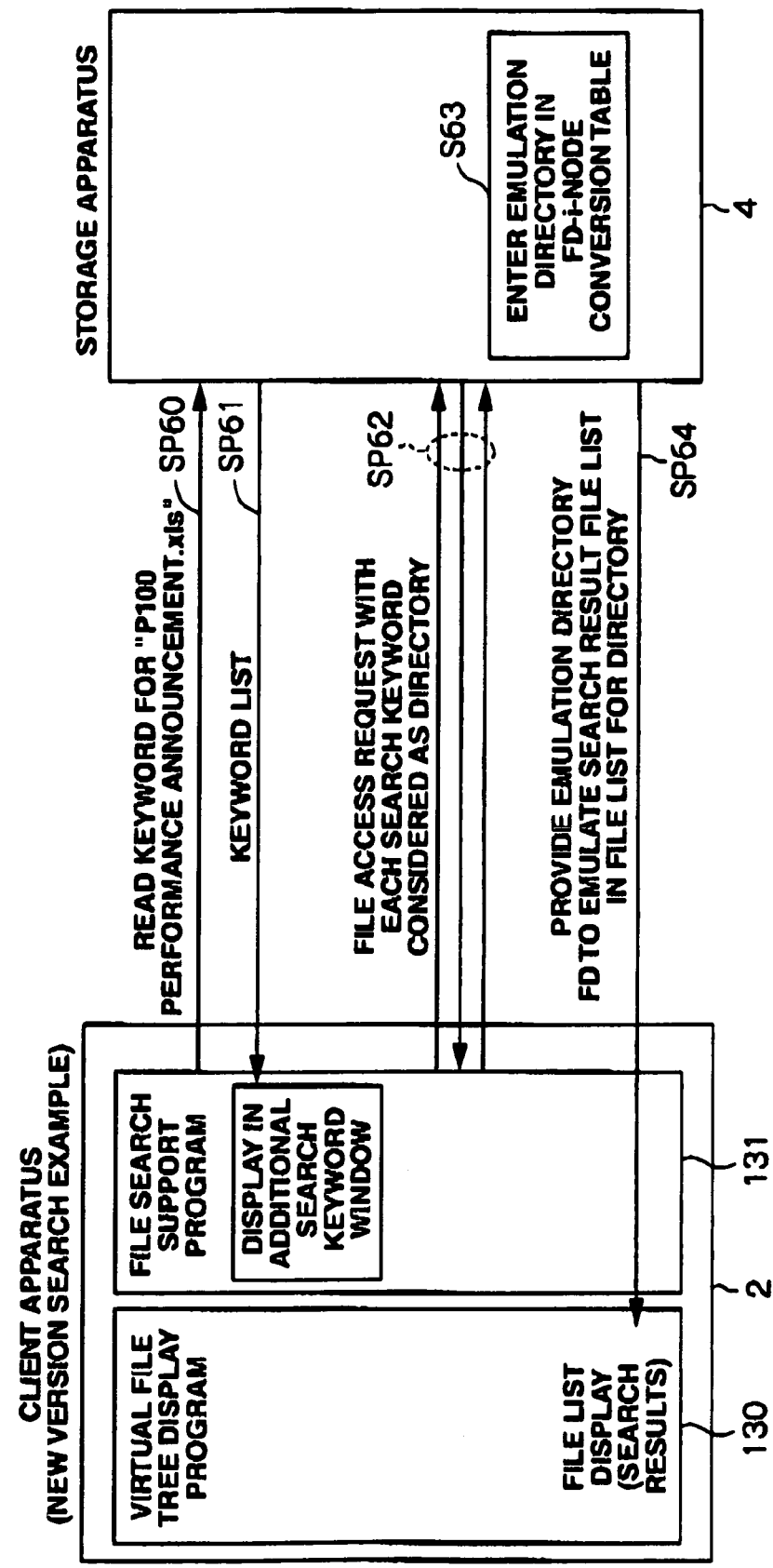
FIG. 20 is a flowchart provided to explain a file search support function in a storage system.

FIG. 20 is a flowchart showing processing in the client apparatus 2 and the storage apparatus 4 in relation to the aforementioned file search support function. In this embodiment, the client apparatus 2 has a virtual file tree display program 130, which is a control program for displaying a user's virtual file tree as shown in FIG. 17, and a file search support program 131, which is a control program for executing the file search support function, stored in the memory 22 (FIG. 1), based on the information obtained as a result of the communication with the storage apparatus 4 described above in relation to FIG. 11.

The CPU 10 in the client apparatus 2, in the state in which the virtual file tree set by the user is displayed on the display based on the virtual file tree display program 130, upon one of the files in the displayed virtual file tree being selected and the right mouse button clicked, displays the search mode menu widow 110 described above in relation to FIG. 18 based on the file search support program 131.

With the above display processing, the CPU 10 also simultaneously designates the selected file (object file) based on the file search support program 131, and sends a request to transfer the keywords for the file, to the storage apparatus 4 (SP60). Upon receipt of the keyword transfer request, the CPU 21 in the storage apparatus 4, referring to the i-node—keyword-search table 60, sends a list of keywords associated with the file to the client apparatus 2 (SP61).

Meanwhile, the CPU 10 in the client apparatus 2, when the same keyword search mode is selected from among the three file search modes (the same keyword search mode, the old version search mode, and the new version search mode) displayed in the search mode menu window 110, sends information designating the object file (hereinafter, referred to as the "object file designation information"), and information indicating the type of selected file search mode (hereinafter, referred to as the "selected file search mode information") to the storage apparatus 4.

If the old version search mode or the new version search mode is selected, the CPU 10 displays the additional search keyword window 111 on the display based on the object file keyword information obtained at step SP61. The CPU 10, when additional search keyword(s) are selected and set in the additional search keyword window 111, and then the OK button in the additional search keyword window 111 clicked, sends the object file designation information and the selected file search mode information to the storage apparatus 4.

Subsequently, the CPU 10 in the client apparatus 2, and the CPU 21 in the storage apparatus 4 search for file(s) satisfying the conditions by executing the same processing as the processing in steps SP22 to SP31 in FIG. 11 with the file series number of the object file and other search keywords considered as directories.

As a result, when the same keyword search mode is designated as a file search mode, files associated with all the keywords other than the file series number for the object file are detected, and when the old version search mode is designated as the file search mode, files associated with the file series number for the object file and all the keywords set using the additional search keyword window 111 shown in FIG. 19 and having the last update times prior to that of the object file are detected. When the new version search mode is designated as the file search mode, files associated with the file series number for the object file and all the keywords set using the additional search keyword window 111 shown in FIG. 19 and having the last update times prior to that of the object file are detected.

Subsequently, the CPU 21 in the storage apparatus 4 provides a file descriptor for a list of files satisfying the conditions, which have been detected by the search processing in cooperation with the client apparatus 2 (hereinafter, referred to as the "search file list"), and registers the search file list in the fd—i-node conversion table as an emulation directory (SP63), and sends the file descriptor provided for this search file list to the client apparatus 2 (SP64).

The above makes it possible for the client apparatus 2 to obtain the search file list and visibly display it on the display by sending a request to transfer the search file list to the storage apparatus 4 using this file descriptor.

(3) Effect of This Embodiment

In the above-described configuration, in response to a request from the client apparatus 2 to search for a classification list set for a directory, the storage apparatus 4, referring to the classification list table 40 and the user virtual directory table 50 stored in the RAM 23, sends the classification list set for the tier matching the request to the client apparatus 2. The client apparatus 2 displays each keyword contained in the classification list received from the storage apparatus 4 as a virtual directory.

Accordingly, the storage system 1 makes it possible for a user to set a flexible directory structure (file tree structure) for the storage apparatus 4 without changing the method of access from the client apparatus 2. Thus, this storage system 1 makes it possible to store a file in a desired directory, and effectively prevent a user from multiplexing a file and having the file in a plurality of directories for his/her own convenience, and thus, obtain a storage system that effectively uses the storage capacity of the storage apparatus.

Figure 21:
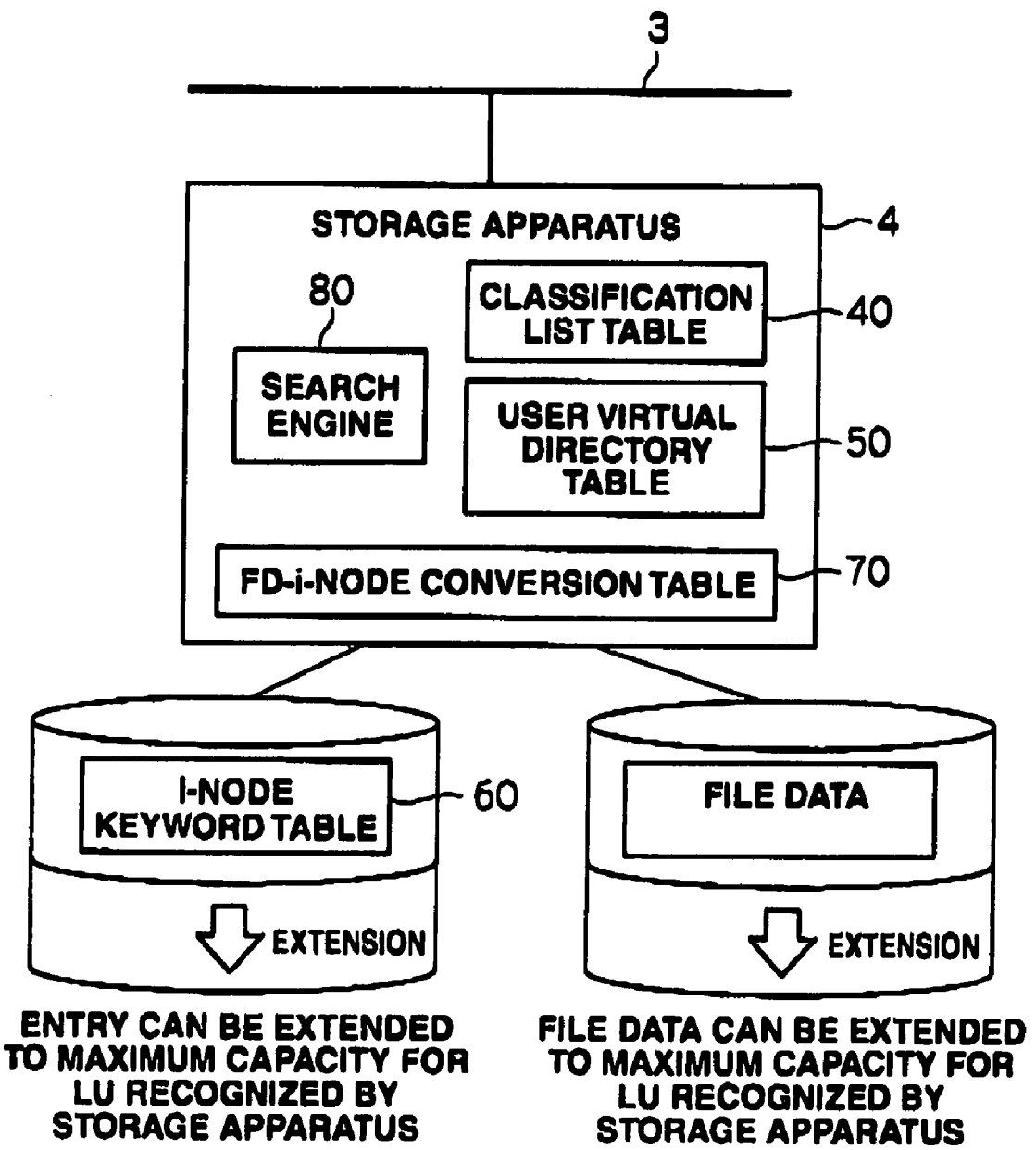
FIG. 21 is a conceptual diagram provided to explain another embodiment of the present invention.

In the storage system 1, as shown in FIG. 21, the i-node—keyword table 60 and the file data can be stored in separate logical volumes, and the number of entries registered in the i-node—keyword table 60 and the file data amount can be extended to the maximum capacity recognizable by the storage apparatus 4 by extending these logical volumes. Therefore, it is possible to effectively prevent the occurrence of file creation restrictions due to lack of i-node area, which has conventionally been a problem. In this case, the size of each entry in the i-node—keyword table 60 is fixed to a certain length (e.g., 128 kbytes), making easy access control to each entry in the i-node—keyword table 60 possible.

(4) Other Embodiments

The above-described embodiment refers to the case where a virtual file tree can have a four-tier structure at a maximum. However, the present invention is not limited to this case, and a virtual file tree with five or more tiers may be set.

The above-described embodiment describes the case where RAM 23 is used as a memory unit that stores an i-node—keyword table 60 as first management information for managing two or more kinds of classification lists, each including one or more keywords; a user virtual directory table 50 as second management information for managing the kinds of classification list set by each user for each tier of his/her virtual file tree; and an i-node—keyword table 60 as third management information for managing keywords, which are directory names of all the virtual directories in the path for a file in the tiers above the file in a virtual file tree set by each user, in relation to the file. However, the present invention is not limited to this case, and various storage devices can be used.

The above-described embodiment also refers to the case where a CPU 21 that controls the entire operation of the storage apparatus 4 is used as a control unit to send, in response to a request from the client apparatus 2 to search for a classification list for a directory, the classification list set by the relevant user for the relevant tier of a virtual file tree to a client apparatus 2 with reference to the i-node—keyword table 60 and the user virtual directory table 50. However, the present invention is not limited to this case, and a control unit may be provided separate from the CPU 21.

The embodiment also describes the case where keywords for each tier of a virtual file tree can be set for each user. However, the present invention is not limited to this case, and keywords for each tier of a virtual file tree can be set for each group consisting of a plurality of users in addition to or in place of the setting for each user.

The embodiment further describes the case where keywords for each tier of a virtual file tree can be set by a user himself/herself. However, the present invention is not limited to this case, and an administrator who manages the users may set the keywords for each tier of the virtual file tree in addition to or in place of the setting by each user.

The present invention can be used in a wide range of storage systems including a storage apparatus having the NAS function.

What is claimed is:

1. A file management apparatus for managing one or more files stored in a storage apparatus, the file management apparatus comprising: a controller; and a memory unit that stores first management information and second management information, wherein the file management apparatus is coupled to a client computer, wherein said first management information includes: a first classification list including a plurality of first keywords; a second classification list Including a plurality of second keywords; and a third classification list including a plurality of third keywords, wherein said second management information: associates said second classification list with a first user at first, and associates said first classification list with said first user next to said second classification list; and associates said first classification list with a second user at first, associates said third classification list with said second user next to said first classification list, and associates said second classification list with said second user next to said third classification list, wherein said controller provides a first directory group to said first user via said client computer, using said first management information and said second management information, the first directory group including: a second directory A whose name is a second I said plurality of second keywords and a second directory B whose name is a second keyword B included in said plurality of second keywords under a root directory; a first directory A whose name is a first keyword A included in said plurality of first keywords and a first directory B whose name is a first keyword B included in said plurality of first keywords under said second directory A; and a first file under said first directory A, and wherein said controller provides a second directory group to said second user via said client computer, using said first management information and said second management information, said second directory group including: said first directory A and said first directory B under a root directory: a third directory A whose name is a third keyword A included in said plurality of third I included in said plurality of third keyword under said first directory A; said second directory A and said second directory B under said third directory A; and said first file under said second directory A.

2. The file management apparatus according to claim 1, wherein said management apparatus is included in said storage apparatus.

3. The file management apparatus according to claim 1, wherein said controller updates said second management information based on new information received from said client computer.

4. The file management apparatus according to claim 1, wherein said memory stores third management information which associates said first file with said first keyword A and said second keyword A, and wherein said controller, in response to a request from said client computer to read said first file, searches for the first file with reference to said third management information.

5. The file management apparatus according to claim 1, wherein said memory stores third management information which associates said first file with said first keyword A and said second keyword A, and wherein said controller, in response to a request Identifying said first file, searches for the a second file which has same file series number as said first file using said first keyword A and said second keyword A with reference to said third management information and using said third keyword A which is provided from said client computer.

6. A file management apparatus for managing one or more files stored in a storage apparatus, the file management apparatus comprising: a controller; and a memory unit that stores first management information and second management information, wherein said first management Information includes: a first classification list including a plurality of first keywords; a second classification list including a plurality of second keywords; and a third classification list including a plurality of third keywords; wherein said second management information: associates said second classification list with a first user at first, and associates said first classification list with said first user next to said second classification list; and associates said first classification list with a second user at first, associates said third classification list with said second user next to said first classification list, and associates said second classification list with said second user next to said third classification list, wherein said controller provides a first directory group to said first user, using said first management information and said second management information, said first directory group including: a second directory A whose name is a second keyword A included in said plurality of second keywords and a second directory B whose name is a second keyword B included in said plurality of second keywords under a root directory; a first directory A whose name is a first keyword A included in said plurality of first keywords and a first directory B whose name is a first keyword B included in said plurality of first keywords under said second directory A; and a first file under said first directory A; and wherein said controller provides a second directory group to said second user, using said first management information and said second management information, said second directory group including: said first directory A and said first directory B under a root directory; a third directory A whose name is a third keyword A included in said plurality of third keywords and a third directory B whose name is a third keyword B included in said plurality of third keyword under said first directory A; said second directory A and said second directory B under said third directory A; and said first file under said second directory A.

7. In a file management apparatus for managing one or more files stored in a storage apparatus and including a controller and a memory unit that stores first management information and second management information, the file management apparatus being coupled to a client computer, wherein said first management information includes a first classification list including a plurality of first keywords, a second classification list including a plurality of second keywords, and a third classification list including a plurality of third keywords, wherein said second management information associates said second classification list with a first user at first, associates said first classification list with said first user next to said second classification list, and associates said first classification list with a second user at first, associates said third classification list with said second user next to said first classification list, and associates said second classification list with said second user next to said third classification list, a method performed by said controller comprising: providing a first directory group to said first user via said client computer, using said first management information and said second management information, the first directory group including a second directory A whose name is a second keyword A included in said plurality of second keywords and a second directory B whose name is a second keyword B included in said plurality of second keywords under a root directory, a first directory A whose name is a first keyword A included in said plurality of first keywords and a first directory B whose name is a first keyword B included in said plurality of first keywords under said second directory A, and a first file under said first directory A, and providing a second directory group to said second user via said client computer, using said first management information and said second management information, said second directory group including said first directory A and said first directory B under a root directory, a third directory A whose name is a third keyword A included in said plurality of third keywords and a third directory B whose name is a third keyword B included in said plurality of third keyword under said first directory A, said second directory A and said second directory B under said third directory A, and said first file under said second directory A.

8. The method according to claim 7, wherein said management apparatus is included in said storage apparatus.

9. The method according to claim 7, further comprising the step of updating said second management information based on new information received from said client computer.

10. The method according to claim 7, wherein said memory stores third management information which associates said first file with said first keyword A and said second keyword A, and wherein said controller, in response to a request from said client computer to read said first file, searches for the first file with reference to said third management information.

11. The method according to claim 7, wherein said memory stores third management information which associates said first file with said first keyword A and said second keyword A, and wherein said controller, in response to a request identifying said first file, searches for the a second file which has same file series number as said first file using said first keyword A and said second keyword A with reference to said third management information and using said third keyword A which is provided from said client computer.

* * * * *

UNITED STATES PATENT AND TRADEMARK OFFICE
CERTIFICATE OF CORRECTION

| | |
|---|---|
| PATENT NO. | : 7,567,969 B2 |
| APPLICATION NO. | : 11/399376 |
| DATED | : July 28, 2009 |
| INVENTOR(S) | : A. Murotani et al. |

It is certified that error appears in the above-identified patent and that said Letters Patent is hereby corrected as shown below:

On the title page, Item (30), should read:

-- Dec. 15, 2005 (JP) .................2005-361977 --.

Signed and Sealed this

Nineteenth Day of January, 2010

David J. Kappos
*Director of the United States Patent and Trademark Office*